United States Patent [19]

Baur et al.

[11] Patent Number: 4,666,695
[45] Date of Patent: May 19, 1987

[54] SETTLING OF SULFUR IN SULFIDE REMOVAL PROCESS

[75] Inventors: Karl Baur, Baierbrunn; Peter Häussinger, Munich; Ludwig Fruhstorfer, Geretsried; Hans-Jurgen Neubert, Munich, all of Fed. Rep. of Germany

[73] Assignee: Linde Aktiengesellschaft, Wiesbaden, Fed. Rep. of Germany

[21] Appl. No.: 742,444

[22] Filed: Jun. 7, 1985

[30] Foreign Application Priority Data

Jun. 8, 1984 [DE] Fed. Rep. of Germany ....... 3421507

[51] Int. Cl.$^4$ .............................................. C01B 17/05
[52] U.S. Cl. .................................... 423/571; 210/721; 423/575
[58] Field of Search ................... 423/574 L, 575, 571; 210/721

[56] References Cited

U.S. PATENT DOCUMENTS

| 1,917,351 | 7/1933 | Young | 423/574 L |
| 2,987,379 | 6/1961 | Urban | 423/575 |
| 3,103,411 | 9/1963 | Fuchs | 423/575 |
| 3,862,335 | 1/1975 | Renault et al. | 423/575 |
| 4,155,988 | 5/1979 | Karwat et al. | 423/575 |

FOREIGN PATENT DOCUMENTS

| 2346083 | 3/1974 | Fed. Rep. of Germany | 423/575 |
| 394917 | 7/1933 | United Kingdom | 423/574 L |

Primary Examiner—John Doll
Assistant Examiner—Jeffrey Edwin Russel
Attorney, Agent, or Firm—Millen & White

[57] ABSTRACT

For the removal of sulfur compounds, especially $H_2S$, from gaseous mixtures, said mixtures are scrubbed with a physical solvent which is later regenerated and reused. To the solvent are added (a) an oxidizing agent for converting the sulfur compounds into elemental sulfur, and (b) additive means for increasing the settling rate of the thus-formed sulfur.

13 Claims, 1 Drawing Figure

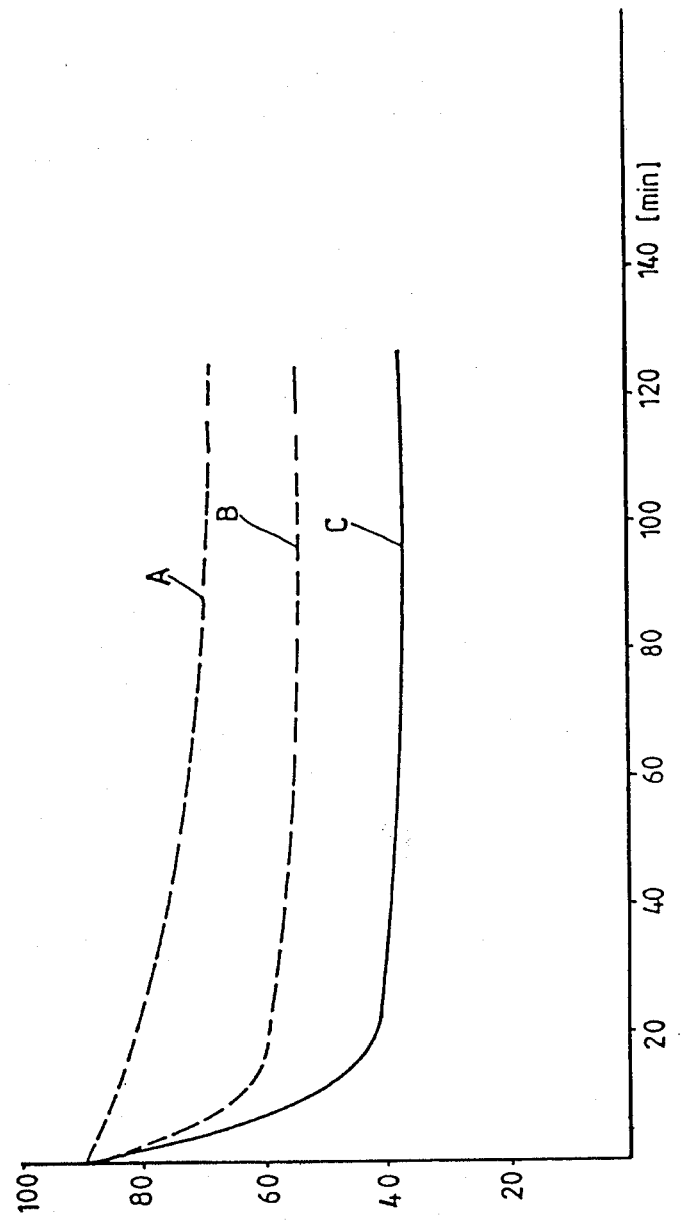

SETTLING OF SULFUR IN SULFIDE REMOVAL PROCESS

CROSS REFERENCE TO RELATED APPLICATION

This application is related to a concurrently filed application, Ser. No. 742,447 entitled "The Removal of Sulfide Compounds from Gases", the contents being incorporated herein.

BACKGROUND OF THE INVENTION

This invention relates to a process for the absorption of sulfur compounds, especially $H_2S$, from hydrocarbon- and/or $CO_2$-containing gases by scrubbing with a physical solvent, and then regenerating and reusing the solvent.

A process step frequently necessary in the processing of raw gas streams is the separation of sulfide compounds, e.g., $H_2S$, COS, $CS_2$, and mercaptans as well as metallic sulfides in some cases. Among these impurities, which generally must be kept away from downstream stages due to their corrosive and catalyst-damaging properties or for other reasons, $H_2S$ is found most frequently in such gas streams and is generally the predominant impurity.

Examples of gaseous streams that require sulfide compound removal include but are not limited to natural gases, refinery gases, coke oven gases, gases from coal refining, and hydrogen-containing gaseous mixtures. The sulfide compounds are separated from these gaseous streams preferably by a gas scrubbing step with, in particular, a physical solvent (for additional details, see "Erdoel- Kohle-Erdgas-Petrochemie vereinigt mit Brennstoffchemie" [Petroleum-Coal-Natural Gas-Petrochemistry Combined with Fuel Chemistry] vol. 35, issue 8, Aug. 1982, pp. 380-385), incorporated by reference herein. The absorbents employed in that process dissolve the sulfur compounds without chemical reaction and can be desorbed of these sulfur compounds by expansion and/or stripping.

In the absorption of, for example, $H_2S$, and subsequent thermal regeneration, the resultant $H_2S$ from the regeneration is generally reacted to sulfur in a Claus plant provided with a tail gas purification system, thus entailing a high expenditure in apparatus.

SUMMARY OF THE INVENTION

An object of one aspect of this invention is to provide an improved process for the desulfurization of gaseous streams. A particular aspect of the invention provides improved settling rates for the solid-phase separation of the sulfur produced during the process.

Upon further study of the specification and appended claims, further objects and advantages of this invention will become apparent to those skilled in the art.

In accordance with one aspect of this invention, an oxidizing agent is added to the scrubbing agent to react the sulfide compounds to elemental sulfur, and an additive is provided that accelerates the conversion rate of the reaction and/or improves the settling rate of the resultant sulfur.

In another aspect of the process of this invention, the sulfide compounds are oxidized in the liquid phase, to elemental sulfur and, depending on the nature of the sulfide compound, to water as well. If this oxidation is conducted at ambient temperature, finely divided sulfur is formed which is usually difficult to separate. However, according to this invention, an additive is supplied to the solvent with the effect that a large-crystalline, readily settleable sulfur is produced. Thus, in principle, the separation of the sulfide compounds takes place by chemical regeneration. Consequently, the invention, by the use of a physical solvent provides a combination of chemical regeneration and physical regeneration which achieves excellent results.

Suitable solvents for the process of this invention are all conventional physical absorption solutions, especially those selective for sulfide compounds as contrasted with, for example, light hydrocarbons or $CO_2$. These solvents include, in particular, alcohols such as, e.g., methanol, ketones, N-methylpyrrolidone, dimethylformamide, polyethylene glycol ethers, butyrolactone, aromatic compounds, e.g., toluene.

Experiments showed that it is especially advantageous to add an oxidizing agent only to the loaded solvent and not before. Otherwise, the sulfide compounds react in the presence of an oxidizing agent so quickly that, when adding the oxidizing agent directly into the scrubbing column or upstream thereof, clogging of the equipment and conduits by the thus-formed sulfur can be avoided only by special measures which increase the cost of the process.

Conversion of the sulfur compounds to elemental sulfur by addition of the oxidizing agent and the additive and optionally also separation of the sulfur from the solvent can be performed in several, series-connected stages, it being possible to utilize in each stage, for example, a different oxidizing agent. In this aspect of the invention, the temperature of the solvent can be lowered in between the successive stages.

The oxidizing agent is generally added in a proportion approximately stoichiometric with respect to the reaction of the sulfide compounds. Deviations from stoichiometry lead to incomplete conversion which, though uneconomical, may be desirable for reasons of operating safety.

The additives employed to accelerate the oxidation reaction and/or to increase the rate of settling of the sulfur are added in effective amounts, advantageously in an amount of 1-20 g/l of solvent, more preferably 1-10 g/1 of solvents.

All substances known to oxidize sulfide to sulfur are suitable in the process of this invention. Especially advantageous proved to be preferably $SO_2$.

With the use of $SO_2$, the conventional Claus reaction takes place in the liquid phase $$2H_2S + SO_2 \rightleftharpoons 2H_2O + 3/xS_x \qquad (2)$$

(With respect to the expression $xS_x$, x generally is in the range of 2 to 8, inclusive.)

The sulfur is immediately formed in the reactions according to Equations 1 and 2, and is easily settleable in the presence of the additives of this invention. This represents an enormous advantage over conventional methods since the sulfur is conventionally obtained in colloidal form, that it does not settle, and cannot be separated easily either by centrifuging or by melting or by flotation. The additive added to the solvent in accordance with this invention generally increases the sulfur particle size to at least 0.1mm, preferably at least 1mm, which permits the sulfur to settle at a satisfactory rate.

Suitable additives for accelerating the settling of the sulfur are ammonia, alkali salts of benzoic acid and of salicylic acid, e.g., sodium, potassium and ammonium benzoates and salicylates and, in particular, ammonium thiocyanate. In general, the additive is introduced into the solvent only once in continuous system where the sulfur depleted-solvent is recycled as scrubbing agent, i.e., the additive remains with the solvent.

Separation of the thus-produced sulfur can be effected in several stages; the temperature and/or the pressure of the solvent can be lowered between successive stages. It proved to be especially advantageous to bring the solvent, for separation of the sulfur, to temperatures of between $-50°$ and $+75°$ C., preferably between $0°$ and $-40°$ C. This can take place, for example, in an internally cooled reactor. The sulfur is then separated from the solvent by conventional solid-liquid separation operations, such as, for example, with the aid of a centrifuge or a filter. The respective temperatures depend on the absorbent employed and thus on the temperature at which absorption is carried out. The settling and separation of the sulfur is preferably a substantially isothermal process, especially without any temperature decrease which would otherwise bring about a precipitate of sulfur which would deposit on heat exchange surfaces.

The process of this invention is especially applicable to the treatment of gases containing hydrocarbons and/or $CO_2$ from which sulfur compounds are scrubbed out. The hydrocarbons, particularly $C_{3+}$ hydrocarbons and/or $CO_2$, do not react with the oxidizing agent or with the additive and can be conventionally separated from the solvent in an individual process step. Further in this connection, reaction of the sulfide compounds by oxidation to elemental sulfur is restricted to $H_2S$.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever. In the following examples, all temperatures are set forth uncorrected in degrees Celsius; unless otherwise indicated, all parts and percentages are by weight.

EXAMPLE

At ambient temperature and under atmospheric pressure, 78 ml of tetraethylene glycol dimethyl ether, is mixed with 2 ml of water and 0.5 g of an additive, and then saturated with hydrogen sulfide. This mixture is combined with 10 ml of solvent saturated with $SO_2$. After a brief mixing period of between 1 and 5 seconds, the settling of the sulfur was observed. Precipitation of the sulfur could be noticed as early as after a few seconds.

BRIEF DESCRIPTION OF THE DRAWING

The attached FIGURE plots settling of sulfur against time wherein the ordinate corresponds to the lines on a cylindrical graduate. The graduate is filled with a mixed cloudy suspension of sulfur corresponding to a value of 100. As the sulfur settles in the cylinder to form a clearer supernatant, the demarcation between the more cloudy and clearer phases is read on the graduate.

DETAILED DESCRIPTION OF THE DRAWING

Referring to the FIGURE, curve A represents a control wherein no additive is used. As can be seen, there is hardly any precipitation of sulfur in this case. This is due to the fact that the sulfur is obtained in such a finely grained or colloidal form that it is suspended in the solvent.

Curve B shows sulfur precipitation with the use of $NH_3$ as the additive. This additive achieved satisfactory sulfur precipitation, but the supernatant solution remained turbid leaving room for improvement. There is a higher exothermic heat of formation because of a side reaction of ammonia with $SO_2$ A readily settleable sulfur could be obtained by adding $NH_4SCN$ (curve C). Ammonium thiocyanate is very highly soluble in water (163 g per 100 g of $H_2$ at $20°$ C.) as well as in glycol ethers.

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. In a process for increasing the rate of settling of sulfur which is present in a physical solvent that is being reused and regenerated, said sulfur being formed from sulfide compounds which have been removed from gaseous mixtures in a separate, prior stage by scrubbing said gaseous mixtures with said physical solvent which absorbs said sulfide compounds, the improvement comprising adding:
   (a) sulfur dioxide as an oxidizing agent to the physical solvent to react the sulfide compounds to elemental sulfur, and
   (b) ammonium thiocyanate in a concentration of about 1-20 g/l of said solvent as an additive for increasing the rate of settling of the said sulfur, said sulfur having a particle size of at least about 0.1mm, and separating the sulfur from said physical solvent under substantially isothermal conditions,
   wherein said solvent is selected from the group consisting of alcohols, ketones, N-methylpyrrolidone, dimethylformamide, polyethyleneglycol ethers, butyrolactone, or aromatic compounds.

2. A process according to claim 1 wherein said oxidizing agent is added in approximately stoichiometric proportions with respect to the sulfide compounds.

3. A process acording to claim 1 wherein said additive is added in an amount of 1-10 g/l of said physical solvent.

4. A process according to claim 1 wherein the step of separating the sulfur from the solvent is performed at $-50°$ C. to $-75°$ C.

5. A process according to claim 1 wherein the step of separating the sulfur from the solvent is performed at $0°$ C. to $+40°$ C.

6. A process according to claim 2 wherein the step of separating the sulfur from the solvent is performed at $0°$ C. to $+40°$ C.

7. A process according to claim 3 wherein the step of separating the sulfur from the solvent is performed at $0°$ C. to $+40°$ C.

8. A process according to claim 1, wherein the sulfide compunds are oxidized in the liquid phase to elemental sulfur and water.

9. A process according to claim 1, wherein the oxidizing agent is added to the solvent after it becomes loaded with sulfide compounds.

10. A process according to claim 1, wherein the separation of the sulfur from the solvent is performed in several, series-connected stages, wherein in each stage a different oxidizing agent is utilized.

11. A process according to claim 1, wherein the formed sulfur has a particle size of at least about 1 mm.

12. A process according to claim 1, wherein the additive for increasing the rate of settling of sulfur is introduced into the solvent only at a single point in a continuous system wherein the sulfur depleted - solvent is recycled as a scrubbing agent.

13. A process according to claim 1 wherein the step of separating the sulfur from said physical solvent is performed by filtration.

* * * * *